(12) United States Patent
Vest

(10) Patent No.: US 6,267,328 B1
(45) Date of Patent: Jul. 31, 2001

(54) HOT AIR INJECTION FOR SWIRLING ROTATIONAL ANTI-ICING SYSTEM

(75) Inventor: Michael S. Vest, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/422,918

(22) Filed: Oct. 21, 1999

(51) Int. Cl.[7] .................................................. B64D 15/04
(52) U.S. Cl. ...................................... 244/134 B; 239/599
(58) Field of Search ............................... 244/134 B, 53 B, 244/134 R, 207, 210, 129.4, 129.5; 60/39.07, 262; 239/265.11, 296, 599, 428.5

(56) References Cited

U.S. PATENT DOCUMENTS

| | | | |
|---|---|---|---|
| Re. 36,215 | * | 6/1999 | Rosenthal ......................... 244/134 B |
| 1,819,497 | * | 8/1931 | Chisolm ............................ 244/134 D |
| 2,135,119 | * | 11/1938 | Wood ................................ 244/134 A |
| 2,680,345 | * | 6/1954 | Frost ................................... 60/39.093 |
| 3,057,154 | * | 10/1962 | Sherlaw et al. .................... 60/39.093 |
| 3,549,964 | * | 12/1970 | Levin et al. ...................... 244/134 C |
| 3,662,583 | * | 5/1972 | Moore, Sr. .............................. 72/370 |
| 3,865,311 | * | 2/1975 | Paxhia et al. ......................... 239/568 |
| 3,925,979 | * | 12/1975 | Ziegler .................................. 60/39.07 |
| 3,933,327 | * | 1/1976 | Cook et al. ....................... 244/134 B |
| 3,936,013 | * | 2/1976 | Yuan ...................................... 244/40 A |
| 4,060,212 | * | 11/1977 | Magenheim ...................... 244/134 D |
| 4,097,000 | * | 6/1978 | Derr ....................................... 239/599 |
| 4,159,200 | * | 6/1979 | Shono et al. ............................ 65/12 |
| 4,250,250 | * | 2/1981 | Miyakawa et al. .................. 430/374 |
| 4,406,431 | * | 9/1983 | Heuberger .......................... 244/53 B |
| 4,482,114 | * | 11/1984 | Gupta et al. ...................... 244/134 B |
| 4,519,423 | * | 5/1985 | Ho et al. ............................... 137/888 |
| 4,688,745 | * | 8/1987 | Rosenthal ......................... 244/134 R |
| 4,957,242 | * | 9/1990 | Schadow et al. ..................... 239/590 |
| 5,357,742 | * | 10/1994 | Miller .................................... 60/39.07 |
| 5,579,999 | * | 12/1996 | Seiner et al. ..................... 239/265.11 |
| 5,941,461 | * | 8/1999 | Akin et al. ......................... 239/428.5 |
| 5,992,763 | * | 11/1999 | Smith et al. ...................... 239/428.5 |
| 6,013,315 | * | 1/2000 | Mandal ................................. 427/240 |

FOREIGN PATENT DOCUMENTS

00536089A1 * 4/1993 (EP) ................................ 244/134 B

OTHER PUBLICATIONS

Engineering Notes, "Novel Nacelle Thermal Anti–Icing Exhaust Grill for Enhanced Mixing", Journal of Aircraft, vol. 34, No. 6, pp. 811–813, Nov. 1997.*

* cited by examiner

Primary Examiner—Robert P. Swiatek
(74) Attorney, Agent, or Firm—Baker Botts L.L.P.

(57) ABSTRACT

An anti-icing system for a nose cowl of an aircraft jet engine. An improved injection nozzle is provided to enhance the injection of hot, pressure gas from the engine into the ambient air within the nose cowl to entrain such air and cause the entrained mass to rotate within the nose cowl in swirling rotational motion and thereby cause the temperature of the nose cowl to rise sufficiently to preclude the formation of ice thereon during flight. The improved injection nozzle preferably includes a plurality of serially spaced elliptically shaped jet nozzles arranged longitudinally and tangentially to the center line of the nose cowl to create vorticity in the resultant injected hot gas flow and enhance its mixture with the ambient air within the nose cowl and thereby preclude any tendency for the formation of an area of elevated temperature in the skin of the nose cowl aft of the position of the injection nozzle under certain design criteria.

34 Claims, 3 Drawing Sheets

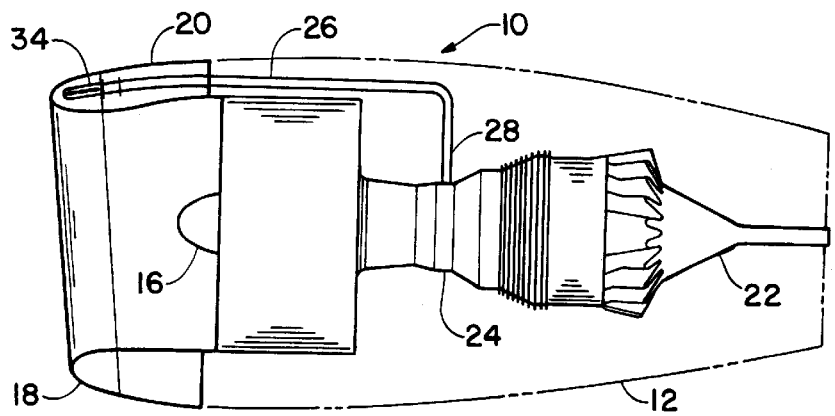
FIG. 1
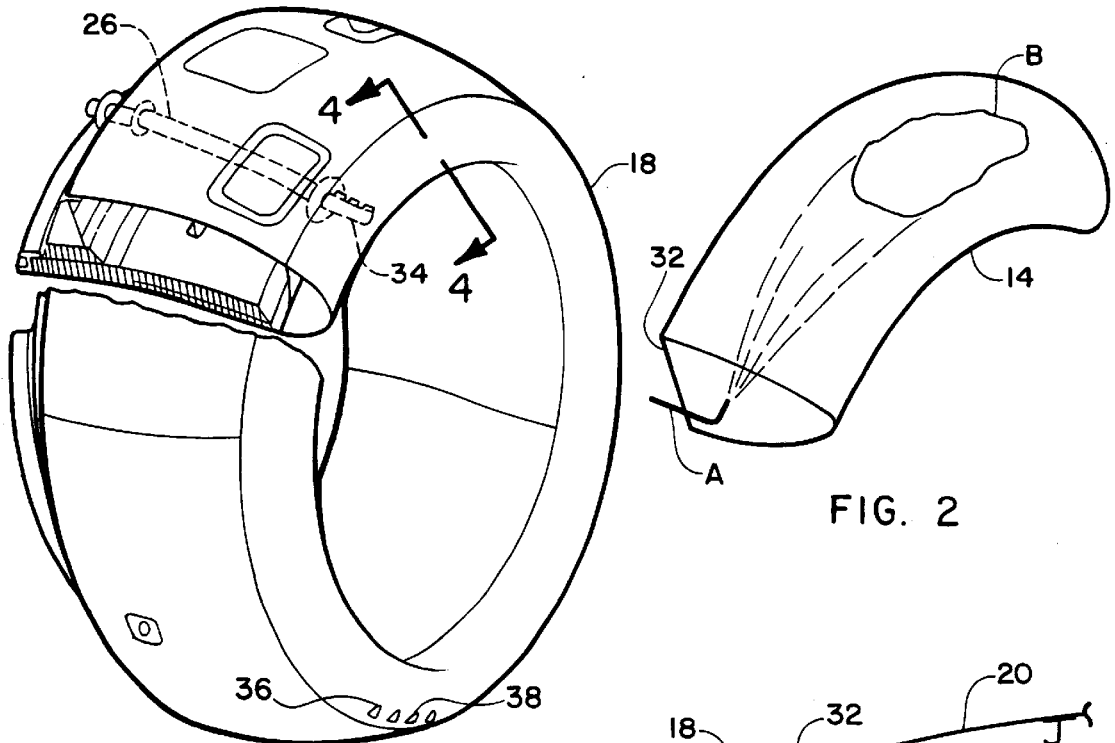
FIG. 2
FIG. 3
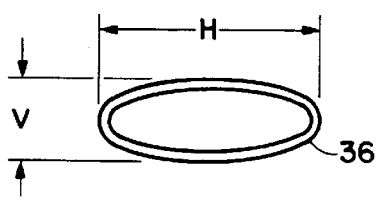
FIG. 4A
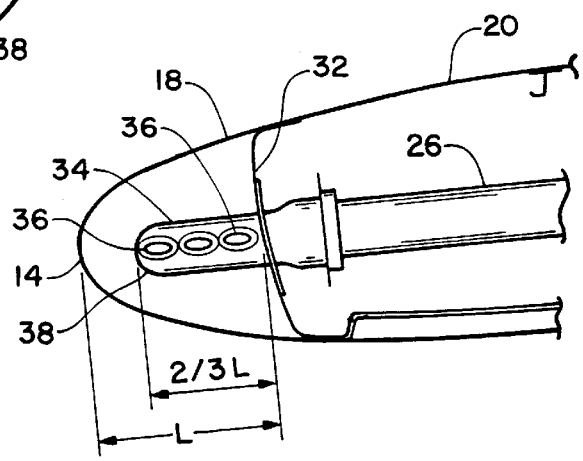
FIG. 4

HOT AIR INJECTION FOR SWIRLING ROTATIONAL ANTI-ICING SYSTEM

BACKGROUND OF THE INVENTION

1. Field of the Invention

The present invention relates to an improvement in anti-icing systems for aircraft jet engine propulsion systems and more particularly, but not by way of limitation, to an improved method and arrangement for hot air injection for a swirling rotational anti-icing system for an inlet of a jet engine that provides for improved mixing of the injected hot gas and enhanced pumping of the air within such inlet.

2. Description of the Prior Art

Safety is a primary concern in the design or power propulsion systems for aircraft applications. The formation of ice on aircraft wings, propellers, air inlets of engines, etc, has been a problem since the earliest days of heavier-than-air flight. Any accumulated ice adds considerable weight, and changes the airfoil or inlet configuration thereby making the aircraft much more difficult to fly and, in some cases, has caused loss of aircraft. In the case of jet aircraft, large pieces of ice breaking loose from the leading edge of an engine inlet housing can severely damage rotating turbine blades which extend across the flow path and interact with the working fluid or other internal engine components and cause engine failure.

Many attempts have been made to overcome the problems and dangers of aircraft icing. Anti-ice systems for the inlet area of nacelles for aircraft propulsion systems have been the focus of a significant amount of research and development within the aircraft industry. For example, proposals have been made, as described in U.S. Pat. No. 2,135,119 to mechanically vibrate external surfaces to break ice loose or as described in U.S. Pat. No. 3,549,964 to generate electro-magnetic pulses in the aircraft skin to break ice loose. These systems, however tend to be heavy and complex and to remove only existing ice, rather than prevent ice formation.

Heating areas of the aircraft prone to icing has been suggested many times. The heating schemes suggested range from microwave heating as suggested by U.S. Pat. No. 4,060,212 to feeding hot gases through holes in the skin, as suggested by U.S. Pat. No. 4,406,431, to resistance heating of the surfaces, as in U.S. Pat. No. 1,819,497, to actually burning fuel adjacent to ice-prone surfaces, as described in U.S. Pat. No. 2,680,345. While each of these methods may have some advantages none had been truly effective.

One of the most common anti-icing techniques has been the ducting of hot gases into a housing adjacent to the likely icing area. Typical of the patents describing such hot gas techniques are U.S. Pat. Nos. 3,057,154; 3,925,979; 3,933,327 and 4,250,250. In each case, the hot gas conduits simply dump hot gases into a housing, such as the leading edge of a jet engine housing or a wing leading edge. While often useful, these systems are not fully effective due to the complexity of the hot gas duct system.

A typical design for a transport aircraft engine nose cowl ice protection system was the double skin, spray bar configuration which employed an annular duct or skin installed within the nose cowl "D-duct" or D-shaped duct space. Hot air jets issuing from small orifices, or piccolo holes, on the spray tube were directed on entrance into the D-duct into double skin passages along the upper and lower lip surfaces of the nose lip of the inlet, away from the high-light portion of the nose lip. Hot air was then forced to flow through narrow gaps between the outside skin and the inner skin, transferring heat to the outer skin. While some heat effectiveness was achieved by the double skin design it was at the expense of high manufacturing cost and weight penalty, associated with the required chem-milling process to produce the inner skin and to provide the spray tube arrangement.

A substantial advance in anti-icing systems was made in U.S. Pat. No. 4,688,745 entitled "Swirl Anti-Ice System" and issued to Rosenthal. This patent provided for the circulation of heated gases within the circular leading edge of a jet engine housing in a rotational swirling motion to prevent ice build up thereon. Hot gas, such as air from a hot, high pressure section of the jet engine was directed to the D-duct inlet interior through a conduit that enters the annular leading edge housing through a bulkhead closure. The conduit is then turned about 90° to a direction tangential to the leading edge annulus. The hot gases exiting an injection nozzle, provided as an outlet of such conduit entrain the cooler air in the circular leading edge and cause the much larger mass of air within the inlet lip to swirl circularly around the interior of the D-duct of the annular housing. The entering hot gas heats the mass of air to an intermediate but still relatively hot temperature which then uniformly transfers heat to the skin of the leading edge without leaving any relatively cold areas and thereby preventing the formation of ice on the inlet lip. A fraction of the flow of entrained heated air that is equal to the flow rate of injected hot gas is exhausted from such D-duct housing.

While this anti-icing system represented a significant advancement over the prior art and has been widely accepted in the aircraft industry, there are areas of the system which may be improved. It has been found that as the sonic jet nozzle injects the hot air into the cooler air within the annular nose cowl or nose lip of the inlet the complete mixing of the two masses of air is somewhat delayed during the rotational swirling action and results in a "hot spot" or area of elevated temperature on the outer lip skin of the nose lip at a position downstream of such injection. This area of elevated temperature in the noselip then presents a constraint in the design of an anti-icing system according to teachings of such patent since such design must take into account actual conditions such as a day having an elevated ambient temperature, a low altitude location for the aircraft that is to take-off, a high engine power setting, and a failure to an open position of an anti-ice valve, provided in the conduit for supplying hot gas from the engine as required.

Thus, there is a continuing need to improve aircraft engine housing icing prevention and to improve particularly the anti-icing system of U.S. Pat. No. 4,688,745 by enhancing the mixing of the injected hot gas and the mass of swirling air contained within the D-duct noselip of an aircraft jet engine housing to improve the performance of the anti-icing system and to lessen design constraints imposed by the area of elevated temperature in the nose lip downstream of the point of injection of the hot gas.

It is a general object of this invention to provide an improved swirling rotational anti-icing system for the nose cowl of a transport aircraft jet engine which enhances the mixing of injected hot, high pressure gas with the larger mass of air within the nose cowl.

It is a further general object of this invention to improve the mixing of hot, pressure gas with the mass of air within the nose cowl and thereby materially reduce any tendency for the injection of such hot, high pressure gas to create an area of elevated temperature in the nose lip at a position downstream of the injection of such hot gas under severe operating conditions.

A further general object of the invention is to enhance the pumping action that the injected hot gas has on the larger mass of air within the nose cowl.

A still further general object is to enhance the circumferential uniformity of noselip temperature and noselip heat rejection to improve the anti-icing efficiency and to prevent ice accumulation on the exterior of the noselip upstream of the point of hot gas injection.

Another general object of the invention is to enable reduction in the noselip cross sectional area and to thereby increase the effectiveness of engine noise attenuation by the inlet by permitting a greater area of sound attenuating structure to be used in the inner barrel of the air inlet.

The foregoing has outlined some of the more pertinent objects of the invention. These objects should be construed to be merely illustrative of some of the more prominent features and application of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates overcoming the above noted problems of the noted prior art and others by the anti-icing system of the present invention which also further improves upon the performance of the generally accepted previous highest standard for an aircraft engine anti-icing system. The present invention contemplates at least one conduit means which directs hot gas from a source of hot, high pressure gases, such as a hot high pressure region of a jet engine to an annular single skin housing or nose lip of the air inlet of an aircraft engine, the air inlet having an acoustically treated inner barrel portion. The hot gas conduit enters the nose lip through a transversely arranged bulkhead and is provided with a nozzle means preferably having at least two and preferably three to four non-circular nozzles disposed at an angle of approximately 90° to the bulkhead so as to inject a high speed hot gas jet into the mass of air within such housing at a high velocity substantially along a tangent to the nose lip interior. The arrangement of the nose lip and bulkhead is sometimes referred to in the art as a "D-duct." The outlet nozzle means of the conduit is provided with a plurality of spaced serially arranged noncircular nozzles that are elliptically shaped, in either a vertical or horizontal dimension, and extend from the bulkhead into the D-duct to create a large scale longitudinal vorticity or transverse stirring aspect to the exiting flows of hot air.

This turbulent flow of injected hot air then mixes more quickly than in the past with the larger mass of lower velocity air in the housing and begins to entrain the larger air mass and brings the velocity of hot gas and air to an intermediate velocity. Likewise, heat is transferred from the injected flow of hot air to the larger mass of air to bring the resultant intermixed flow of rotating swirling flow of air up to an intermediate, but still high, temperature. In effect, energy is conserved by trading high velocity and high temperature in the small mass of injected hot gas for lower velocity and a slightly lower temperature in a larger mass of air/hot gas mixture which still has a temperature sufficiently high to relatively uniformly heat the skin of the noselip to a temperature which precludes the formation of ice on the external surface of the nose lip.

Thus, the improved mixing of the hot gas and the mass of internal air precludes the formation of an area of unduly elevated temperature on the nose lip at a position downstream of the injection of hot gas and precludes formation of an area of unduly cold temperature on the nose lip at a position upstream of the injection of hot gas and improves uniformity of heat rejection around the D-duct circumference. An outlet means is provided in the nose lip bulkhead construction to permit the exhaust of a flow of mixed air from the D-duct that is equal to the flow of hot air injected into such housing. An alternative outlet means, and presently preferred structure, is to provide an outlet means through slots provided in the noselip itself, preferably at the bottom outer portion of such nose lip. This construction has been found to be a very efficient and simple anti-icing system that improves the effective heat transfer that takes place from the large mass of heated moving air to the D-shaped duct wall while retaining mechanical simplicity. There are no moving mechanical parts or electrical parts to jam or burn out.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 1 is a schematic elevation view, partially in section, of an exemplary gas turbine or jet engine showing the anti-icing system of the present invention.

FIG. 2 is a schematic perspective of a portion of a hot gas injection nozzle of the prior art and creation of an area of elevated temperature in the nose lip at a location aft of the injection of hot gas by the nozzle.

FIG. 3 is a schematic perspective, partially in section, of an annular air inlet for a jet engine illustrating the location of the anti-icing system of the present invention.

FIG. 4 is a partial section taken along lines 4—4 of FIG. 3 to illustrate a first embodiment of the novel hot gas nozzle of the invention.

FIG. 4A is an end view of an elliptical nozzel of the invention.

Similar numerals refer to similar parts in all FIGURES.

DETAILED DESCRIPTION OF THE DRAWINGS

Figure 5:
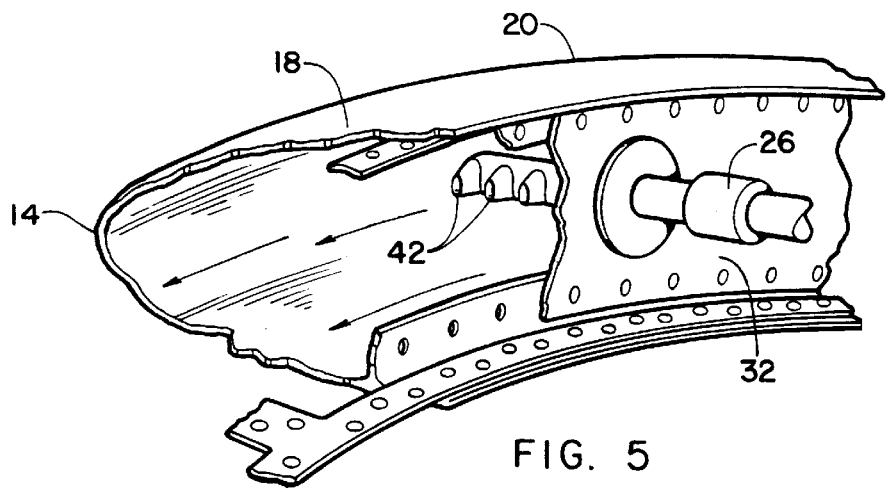
FIG. 5 is a schematic section of the nose lip of FIG. 3 that illustrates the injection of hot gas into the inlet and the rotational swirling mixed flow for a second embodiment of the invention.

Referring now to the drawings in detail and in particular to FIG. 1, there is seen a schematic representation of an exemplary turbofan jet turbine engine 10 of the type suitable for aircraft propulsion. The turbine engine 10 is housed within a core cowl housing 12. Air enters the engine 10 through an air inlet section, between the nose cap 16 of the engine and the nose lip 18 or annular single skin housing which constitutes the forward most section of the air inlet 20 of the engine nacelle, some of which components have been omitted from FIG. 1 for purposes of ease of understanding. Engine thrust is produced by burning incoming air and fuel within the engine 10 positioned with the central housing 12. Hot, high pressure propulsion gases of the core engine 10 pass through exhaust outlet 22 and out the rear of the engine.

In flight, under "icing conditions", ice tends to form on the nose lip 18 (in addition to other aircraft components not being considered here). The ice changes the geometry of the inlet area between the nose lip 18 and the spinner or nose cap 16, adversely affecting the required quantity and flow path of incoming air. Also, pieces of ice may periodically break free from these components and enter the engine, damaging rotor blades and other internal engine components. This invention is concerned with preventing the accumulation of ice on the surface of the annular housing 18 and with minimizing design constraints associated with the utilization of a swirling rotational anti-icing system. Other techniques may be used with the nose cap 16 and other aircraft parts, such as control surfaces, and the like.

Within the compressor section 24 of the jet engine 10 there is a region containing hot, high pressure gases. A suitable conduit means 26 or tube is connected at a first end 28 to that hot, high pressure region. The other end 30 is operatively coupled to a bulkhead 32 that substantially closes the nose lip 18 to form the D-duct to enclose a quantity of air with the annular space created by such bulkhead 32 and the nose lip 18 to provide a flow of hot gas to the interior of such D-duct. In some prior art ice prevention methods, the tube simply terminates at this point, serving to deliver hot gases into the annular space. At times in prior art systems such hot, high pressure gas was delivered to what is termed a "piccolo tube" system for distributing hot gas though apertures in a tube to the vicinity of the leading edge of a nose lip. Even with complex, heavy, ducting within the annular housing, heating of the nose lip was not uniform with some hot spots and other cold spots which tended to accumulate ice. Sometimes a large number of tubes were used in order to bring more hot air forward. The additional tubes added considerable weight and still allowed hot and cold areas.

Figure 6:
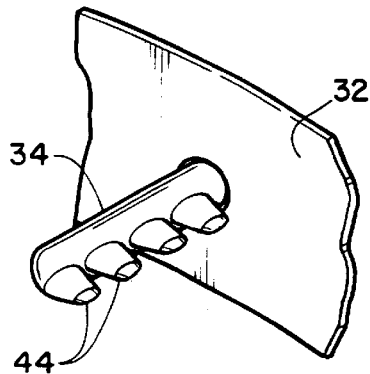
FIG. 6 is a schematic perspective illustrating a third embodiment of the invention.

Referring momentarily now to FIG. 2, as exemplary of the swirl anti-icing system of U.S. Pat. No. 4,688,745 of the prior art, the disclosure of which patent is incorporated by reference, in which it will be seen that a nose lip 14 is closed by a bulkhead 32 and a nozzle "A" which extends outwardly from the bulkhead 32 in a direction that is parallel to the centerline of the bulkhead 32 and then in a direction that is approximately 90° tangential to such centerline. The nozzle A then injects a flow of hot high pressure gas from the engine into the mass of air within the housing 14 and entrains it in a rotational swirling motion. The hot temperature gas then mixes with the mass of air within the housing 14 to increase the mixed flow to an elevated intermediate temperature which is sufficient to preclude the formation of ice on the leading edge of the annular housing 14. A suitable exhaust means (not shown) is provided to permit a quantity of intermediate temperature gas and air, that is equal to the amount of hot gas injected into the housing 14 by the nozzle A, to escape from the housing 14. Such an anti-icing system, as seen in FIG. 6, while superior to any other anti-icing system for an aircraft engine thereto before known, is subject to several design constraints.

While the nozzle A does entrain the ambient quantity of air contained within the housing 14 in a rotational swirling movement, such entrainment is not immediate and in certain applications, e.g., if a valve in the conduit A were to be stuck in an open condition the heat of the injected hot gas may not be immediately transferred to the entrained mass of air and may to tend to create an area B in the nose lip 14 that has an elevated temperature with respect to the remaining portion of the nose lip 14. For example, an exemplary temperature for the injected hot gas may be around 1000° F. while the temperature of the entrained rotational swirling hot gas and air mixture may be around 400° F. Thus, this area of elevated temperature or "hot spot" operates as a design constraint when designing the anti-icing system and the elements of the air inlet 20. For example, the inlet 20 and the nose lip 18, among other components, must be designed to operate in an acceptable manner under such simultaneously occurring conditions for the aircraft as a hot day, low altitude of the airfield, imposition of take-off power for the aircraft, and the failure of a valve imposed in the hot gas conduit 26 so as to permit that hot gas to flow into housing 14 under all conditions (not just a desired anti-icing flight condition).

Referring now to FIGS. 3, 4A and 4, the primary novel features of a first embodiment of my invention is illustrated. In FIGS. 3,4 and 4A it will be seen that it will be seen that the conduit 30 carrying the hot, high pressure gas from the compressor section of a jet engine 10 extends to the bulkhead 32 that closes off the annular nose lip 18 of the inlet 20 to create an annular chamber filled with air. The conduit 26 has an outlet nozzle 34 means connected to its outlet. The nozzle means 34 is provided with a plurality of spaced elliptically shaped injection nozzles 36 for injecting hot gas from the engine into the D-duct and thereby entraining the ambient air contained within the D-duct and cause the entrained mixture of hot gas and ambient air to rotate within the D-duct in a rotating swirling flow. The commingled flow of hot gas will reach a temperature that is intermediate of the temperature of the injected hot gas and of ambient air within the D-duct. The D-duct 14 is provided with a suitable exit area 36, preferably on the outer portion of the D-duct to permit a volume of mixed air to flow from the D-duct that is equal to the volume of hot gas that is injected into the D-duct through the nozzle means 34. In the illustrated embodiment of the invention, the exit area is seen as a plurality of spaced slots 38.

As seen especially in FIG. 4, the nozzle means 34 extends into the D-duct to present, in a first embodiment, three spaced elliptically shaped injection nozzles 36 that are serially arranged and extend longitudinally from the bulkhead 32 into the D-duct a distance that is preferably no greater than two-thirds the distance from the bulkhead 32 to the highlight 14 of the nose lip 18.

It will be recognized that as the hot gas is emitted from the elliptical nozzles 36 of the enhanced nozzle 34 the hot gases rapidly mix with the ambient air in the noselip, accelerating the entire air mass to move circularly in the circular direction seen in the FIGURES and to rapidly reach a temperature intermediate between the entering hot gas temperature and that of the stagnant air. The temperature of the air within the nose lip 18 rises until a stable temperature is reached at which heat lost will, by conduction through the skin of the housing 18 and carried off with the exhaust mixture passing though the slots 38, equal the heat being injected by additional hot gas through the nozzle 34. With the enhanced nozzle 34 and the enhanced mixing of the hot, high pressure gas and the air contained within the housing 14, any tendency of the rotating heated air mass to generate an area of elevated temperature in the skin of the nose lip 14 at a location downstream of the site of the nozzle 34 and the initial injection of the hot, high pressure gas will be materially reduced.

Looking now to FIG. 4A, a more detailed look will be taken at an exemplary elliptical nozzle 36 which has an aspect ratio of 3H. This means that the horizontal length H of a nozzle 36 is three times the vertical height V. Similarly, an aspect ratio of 3V would indicate that the vertical height V of the nozzle 36 would be three times the horizontal length H of that particular configuration of the nozzle 36. It is to be recognized that the total combined area of the nozzles 36 will be somewhat less that the cross-sectional area of the conduit 26 in order to assure that each nozzle 36 of the nozzle means 34 will be approximately equally pressurized.

In FIG. 5 a second embodiment of the invention is illustrated. In this embodiment the enhanced nozzle 34 comprises three elliptically shaped nozzles 42 that are serially arranged and extend longitudinally into the D-duct 20 from the bulkhead 32. The nozzles 42 have an aspect ratio of 3V to indicate that the vertical height V of each is at least 3 times greater that the horizontal length H. Again, the three nozzles 42 will not extend into the D-duct a distance greater than two-thirds of the distance from the bulkhead 32 to the highlight 14.

In FIG. 6 a third embodiment of the invention is illustrated. In the third embodiment the nozzle 34 is illustrated as comprising four elliptically shaped nozzles 44 that are serially arranged and extend longitudinally into the D-duct 20 from the bulkhead 32. The nozzles 44 preferably have an aspect ratio of 3H and will be seen to extend from the bulkhead 32 a distance that may be greater than two-thirds the distance from the bulkhead 32 to the highlight 14 of the nose lip 20. However, in any event the elliptical nozzle 44 which is spaced furthest from the bulkhead 32 will be spaced sufficiently distant from the highlight 14 of the nose lip 20 to preclude the creation of an area A of elevated temperature in the nose lip 20 as seen in FIG. 2.

Figure 7:
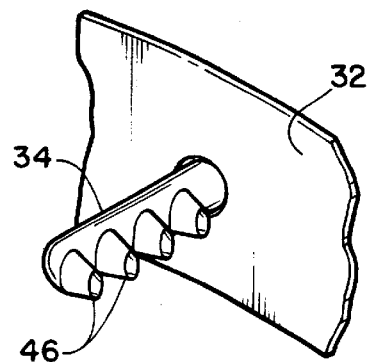
FIG. 7 is a schematic perspective illustrating a fourth embodiment of the invention.

In FIG. 7 a fourth embodiment of the invention is illustrated. In the fourth embodiment the nozzle 34 is illustrated as comprising four elliptically shaped nozzles 46 that are serially arranged and extend longitudinally into the D-duct 20 from the bulkhead 32. The nozzles 44 preferably have an aspect ratio of 3V and will be seen to extend from the bulkhead 32 a distance that may be greater than two-thirds the distance from the bulkhead 32 to the highlight 14 of the nose lip 20. However, in any event the elliptical nozzle 46 which is spaced furthest from the bulkhead 32 will be spaced sufficiently distant from the highlight 14 of the nose lip to preclude the creation of an area A of elevated temperature in the nose lip 20, as seen in FIG. 2.

Figure 8:
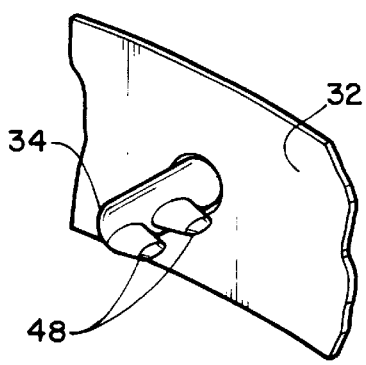
FIG. 8 is a schematic perspective illustrating a fifth embodiment of the invention.

Referring now to FIG. 8, a fifth embodiment of the invention is illustrated. In this fifth embodiment the nozzle 34 is illustrated as comprising two elliptically shaped nozzles 48 that are serially arranged and extend longitudinally into the D-duct 20 from the bulkhead 32. The nozzles 48 preferably have an aspect ratio of 3H and will be extend from the bulkhead a distance that is less than two-thirds the distance from the bulkhead 32 to the highlight 14 of the nose lip 20, as was the instance in the first embodiment shown in FIG. 4.

Figure 9:
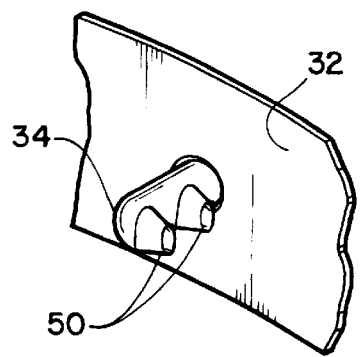
FIG. 9 is a schematic perspective illustrating a sixth embodiment of the invention.

In FIG. 9, a sixth embodiment of the invention is illustrated. In this sixth embodiment the nozzle 34 is illustrated as comprising two elliptically shaped nozzles 50 that are serially arranged and extend longitudinally into the D-duct 20 from the bulkhead. The two nozzles 50 will preferably have an aspect ratio of 3V and will extend from the bulkhead a distance that is less than two-thirds the distance from the bulkhead 32 to the highlight 14 of the nose lip 20, as was the instance in the first embodiment shown in FIG. 3.

Figure 10:
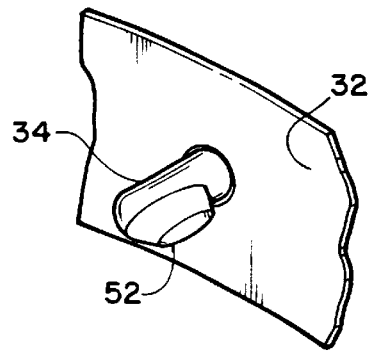
FIG. 10 is a schematic perspective illustrating a seventh embodiment of the invention.

In FIG. 10, a seventh embodiment of the invention is seen. In the seventh embodiment, the nozzle 34 is shown as comprising one elliptically shaped nozzles 52 that is spaced from and extends longitudinally into the D-duct 20 from the bulkhead 32. The single nozzles 52 preferably has an aspect ratio of around 3H.

Figure 11:
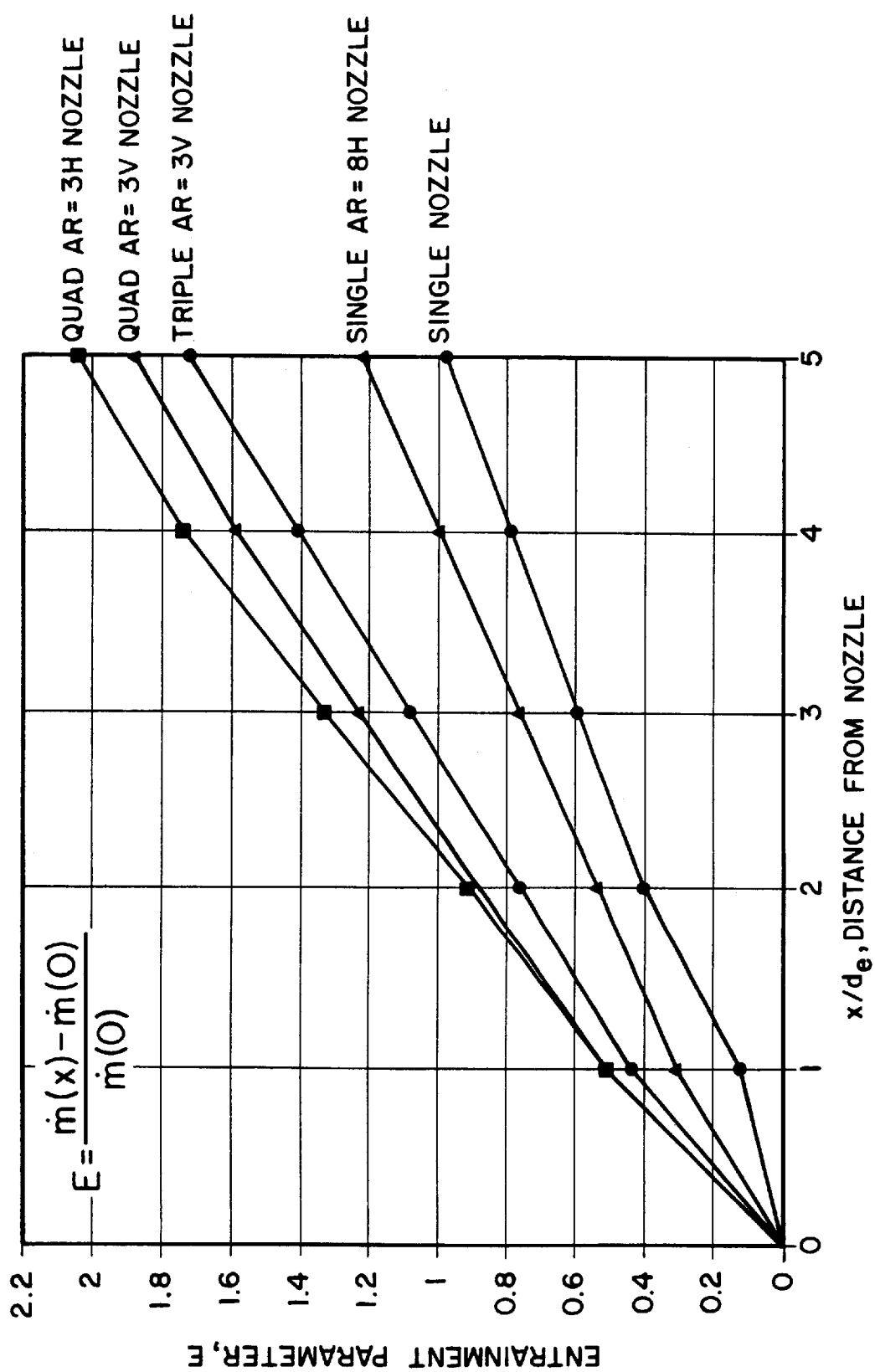
FIG. 11 is a chart representing a comparison of the performance of the present invention to that of the prior art.

Referring now to FIG. 11, a comparison of the performance of various preferred embodiments of the present invention to the prior art of rotational swirling anti-icings systems is seen. The chart of FIG. 10 illustrates a comparison of a measured entrainment parameter, E, to an equivalent nozzle jet diameter $d_e$ for a number of embodiments of the present invention and the single annular nozzle of the rotational swirling anti-icing system of U.S. Pat. No. 4,688, 745. As seen in FIG. 11, entrainment parameter E for a specific distance from the nozzle 34, shown on the abscissa of FIG. 11 material enhances the entrainment of the air contained within the D-duct 20 thereby promoting the mixing of the hot gas issuing from the elliptical nozzles of the present invention and enhancing the uniformity of heating the D-duct 20 while precluding the formation of an area of elevated temperature on the outer portion of the D-duct aft of the improved nozzle means 34 of the present invention.

The present invention includes that contained in the appended claims as well as that of the foregoing description. Although this invention has been described in its preferred forms with a certain degree of particularity, it is understood that the present disclosure of the preferred form has been made only by way of example and numerous changes in the details of constructions and combination and arrangement of parts and method steps may be resorted to without departing from the spirit and scope of the invention. For example, while in each exemplary embodiment of the present invention all of the elliptical nozzles have a specific aspect ratio with either the horizontal or vertical length predominating so as to have, for example, three nozzles having an aspect ratio of 3H it would be within the scope of the invention to provide a nozzle means having a mixture of horizontal and vertical lengths predominating, e.g., 3H, 3V, and 3H. Also, while at present an aspect ratio of 3:1 is preferred for the shape of the elliptical nozzles it would also be within the scope of the invention to vary such aspect ratio somewhat to achieve the same beneficial results when the shape of the D-duct requires some accommodation in the aspect ratio of the nozzles.

Further while the elliptically shaped nozzles of the present invention have been shown in embodiments that are arranged substantially vertically or substantially horizontally it would be within the scope of the invention to arrange such nozzles within the nose cowl at an angle that varies from a strict vertical or horizontal orientation. For example, a vertical orientation of an elliptically shaped nozzle would include a 90° orientation from the centerline of the nozzle and other exemplary angles as well, such as 45°, 60°, and 75°.

What is claimed is:

1. An anti-icing system comprising:

a substantially closed annular single skin nose cowl having an exterior surface and an interior surface and positioned at the leading edge of an inlet of an aircraft jet engine propulsion system and arranged for grazing flow of ambient air over the exterior surface when the aircraft is in flight, the annular nose cowl containing a quantity of air;

a source of high pressure hot gas;

at least one conduit coupled to the source of high pressure hot gas and having an outlet end coupled to said nose cowl;

an outlet nozzle provided on the outlet end of said at least one conduit, said outlet nozzle including a plurality of spaced elliptically shaped jet nozzles to create turbulence and transverse sting in the hot gas low, said jet nozzles being oriented to eject said hot gas at high velocity in a direction substantially tangential to a centerline of said annular nose cowl, and whereby the turbulent high velocity hot gas flow issuing from the jet nozzles entrain air within said annular nose cowl so that the total volume of air and hot gases swirling around the interior of said annular nose cowl in a rotational direction has a substantially uniform temperature intermediate between that of said air and said hot gas flow and by direct contact with the interior surface of the nose cowl substantially uniformly heats the single skin nose cowl to a temperature that is sufficiently high to preclude the formation of ice on the exterior surface of the single skin nose cowl by the grazing flow of ambient air when the aircraft is in flight while also precluding the creation of an area of unduly elevated temperature in said nose cowl at a location aft of said outlet nozzle.

2. The anti-icing system of claim 1 wherein the annular nose cowl is closed by a transverse bulkhead and an air outlet means is provided in the annular nose cowl to permit a volume of swirling heated air and hot gas to be exhausted at rate substantially equal to the volume of hot gas being injected into the housing through said at least one conduit.

3. The anti-icing system of claim 2 wherein the jet nozzles of the outlet nozzle are positioned about 90° with respect to said bulkhead to provide said tangential orientation.

4. The anti-icing system of claim 3 wherein said plurality of jet nozzles are spaced from and extend serially longitudinally from the bulkhead into the annular nose cowl.

5. The anti-icing system of claim 3 wherein the number of spaced jet nozzles falls within a range of 2–4 and such jet nozzles are arranged longitudinally from the bulkhead.

6. The anti-icing system of claim 5 wherein each of said elliptically shaped jet nozzles has an outlet area having a horizontal length that is at least three times the height of such area.

7. The anti-icing system of claim 6 wherein each of said elliptically shaped jet nozzles has an outlet area having a vertical height that is at least three times the horizontal length of such area.

8. The anti-icing system of claim 7 wherein the cross-sectional area of the at least one conduit is greater that the total outlet nozzle area of the plurality of the jet nozzles to insure that all such jet nozzles receive a supply of hot gas having substantially the same pressure.

9. The anti-icing system of claim 8 wherein the plurality of jet nozzles are serially arranged and extend longitudinally into the nose cowl a distance that is no more than two/thirds of the distance from the leading edge of the nose cowl to the bulkhead.

10. The anti-icing system of claim 8 wherein the plurality of jet nozzles are serially arranged and extend longitudinally from the bulkhead a distance that is greater than two/thirds the distance from the leading edge of the nose cowl to the bulkhead but which permits the jet nozzle spaced furthest from the bulkhead to be spaced sufficiently distant from a leading edge of the nose cowl to preclude an area of unduly elevated temperature in an area of the nose cowl aft of the flow of hot gas from such jet nozzle.

11. The anti-icing system of claim 1 wherein the outlet nozzle injects a hot stream of gas into the mass of air within the nose cowl at a rate to provide a mass flow rate, of the hot gas and air swirling in said annular nose cowl in a rotational direction around the interior of said annular nose cowl and in direct contact with the interior surface of such nose cowl, being at least about three times the mass flow rate of mixed air and hot gases leaving said outlet.

12. An anti-icing system for annular aircraft jet engine inlet cowls which comprises:

a substantially annular single skin nose lip having an exterior surface and an interior surface and positioned at the leading portion of an aircraft jet engine;

a bulkhead substantially closing the aft end of said single skin nose lip to provide an annular D-shaped duct;

a region of the jet engine having therein a hot, high pressure gas;

at least one conduit adapted to carry hot gas from said region having a temperature of about 100 to 500 degrees F. and a velocity of about 3 to 30 ft./min, said at least one conduit having an outlet end coupled to said housing through said bulkhead;

an outlet nozzle which includes a plurality of spaced hot gas injection nozzles coupled to said outlet end of said conduit each injection nozzle having an elliptical shape and being oriented to eject said hot gas at a high velocity in a direction substantial tangential to the centerline of said annular nose lip and into the flow of hot gas issuing from said nozzle to create turbulence in said hot gas flow, and the turbulent high velocity hot gas flow issuing from each injection nozzle entrains air within said annular single skin nose lip so that the total volume of air and hot gas swirling around the interior of said annular nose lip in a rotational direction has a substantially uniform temperature of from 35 to 41 degrees F. when the outside air temperature is about −40 degrees F. and the mass flow rate of said hot gas and air is about three times the mass flow rate of the gases leaving said outlet nozzle whereby such rotating hot gas and air by direct contact with the interior surface of said single skin annular nose lip raises the temperature of said D-shaped duct to a substantially uniform temperature that is sufficiently high to preclude the formation of ice on the exterior surface of said nose lip while simultaneously precluding the creation of an area of elevated temperature in said nose lip at a location aft of the point of injection of hot gas through said outlet injection nozzles.

13. The anti-icing system of claim 12 that also includes an exhaust means that is sized to permit the exhaust of a volume of swirling air and hot gas from within the D-shaped duct at least equal to the volume of hot gas injected into the D-shaped duct though the plurality of jet nozzles.

14. The anti-icing system of claim 13 wherein there are three jet nozzles.

15. The anti-icing system of claim 14 wherein the three jet nozzles extend longitudinally from the bulkhead into the D-shaped duct a distance that is no greater than two/thirds the distance from a leading edge of the nose lip to said bulkhead.

16. The anti-icing system of claim 13 wherein there are four jet nozzles.

17. The anti-icing system of claim 16 wherein the four nozzles are serially arranged and extend longitudinally from the bulkhead into the D-shaped duct a distance that is greater than two/thirds of the distance from the bulkhead to the leading edge of the nose lip.

18. A method of providing an anti-icing system for a nose cowl for an annular air inlet of an aircraft jet engine propulsion system which precludes the creation of a hot spot on such nose cowl in the vicinity of injection of high pressure hot gas into such nose cowl, which method comprises the steps of:

providing a single skin nose cowl positioned at the leading edge of an air inlet of an aircraft jet engine that is substantially closed by an aft bulkhead to enclose a quantity of air;

providing a source of high pressure hot gas;

introducing said high pressure hot gas into the quantity of air enclosed within said nose cowl in a direction substantially tangential to a centerline of said nose cowl to entrain the mass of gas within the nose cowl to create a volume of hot gas and air swirling in a rotational direction around the interior of said nose cowl at a substantially uniform temperature that is sufficiently high to preclude the formation of ice on an exterior surface of said nose cowl during flight, and creating turbulence and transverse stirring within the flow of high pressure hot gas during its introduction into said quantity of air by introducing such hot gas through a plurality of spaced elliptically shaped injection nozzles to thereby enhance the commingling of said hot gas and said quantity of air to preclude the creation of an area of elevated temperature on said nose cowl at a position aft of the point of introduction of said hot gas.

19. The method of claim 18 wherein the step of creating turbulence and transverse stirring within the flow of high pressure hot gas includes arranging such spaced injection nozzles to extend longitudinally into said nose cowl from the aft bulkhead.

20. The method of claim 19 which further includes the step of forming the shape of each elliptically shaped injection nozzle to have one dimension that is at least three times greater than its transverse dimension.

21. The method of claim 18 wherein the step of creating turbulence and transverse stirring within the flow of high pressure hot gas is created by introducing such hot gas through a single elliptically shaped injection nozzle arranged within said nose cowl in a direction tangential to the center line of said nose cowl to thereby enhance the commingling of said hot gas and said quantity of air to precluded the creation of an area of elevated temperature on said nose cowl at a position aft of the point of introduction of said hot gas.

22. An anti-icing apparatus comprising:

a substantially closed annular nose cowl comprising an exterior surface and an interior surface and capable of being positioned at the leading edge of an inlet of an aircraft jet engine propulsion system;

at least one conduit comprising an outlet end coupled to the nose cowl, wherein the at least one conduit is capable of being coupled to a source of high pressure hot gas; and an outlet nozzle provided on the outlet end of the conduit, wherein the outlet nozzle comprises a plurality of spaced elliptically shaped jet nozzles oriented to eject hot gas in a direction substantially tangential to a centerline of the nose cowl.

23. The apparatus of claim 22, wherein the nose cowl is closed by a transverse bulkhead and the nose cowl further comprises an outlet to permit air and gas to exit the nose cowl.

24. The apparatus of claim 23, wherein the jet nozzles are positioned about 90° with respect to the bulkhead.

25. The apparatus of claim 23, wherein the jet nozzles are spaced from and extend longitudinally from the bulkhead into the annular nose cowl.

26. The apparatus of claim 22, wherein each of the jet nozzles has an outlet area having a horizontal length that is at least three times the vertical height of the area.

27. The apparatus of claim 22, wherein each of the jet nozzles has an outlet area having a vertical height that is at least three times the horizontal length of the area.

28. The apparatus of claim 22, wherein the cross-sectional area of the conduit is greater than the total outlet area of all the jet nozzles.

29. The apparatus of claim 22, wherein the nose cowl is close by a transverse bulkhead and provides an annular D-shaped duct.

30. The apparatus of claim 29, wherein the nose cowl additionally comprises an outlet to permit air and gas to exit the D-shaped duct.

31. An anti-icing system comprising:

a substantially closed annular single skin nose cowl having an exterior surface and an interior surface and positioned at the leading edge of an inlet of an aircraft jet engine propulsion system and arranged for grazing flow of ambient air over the exterior surface when the aircraft is in flight, the annular nose cowl containing a quantity of air;

a source of high pressure hot gas;

at least one conduit coupled to the source of high pressure hot gas and having an outlet end coupled to said nose cowl;

an outlet nozzle provided on the outlet end of said at least one conduit, said outlet nozzle having a configuration selected from the group consisting of (i) a single elliptically shaped jet nozzle having an outlet area having a horizontal length which is eight times the vertical height of the nozzle, (ii) three elliptically shaped jet nozzles each having an outlet area having a vertical height which is three times the horizontal length for each nozzle, (iii) four elliptically shaped jet nozzles each having an outlet area having a vertical height which is three times the horizontal length for each nozzle, and (iv) four elliptically shaped jet nozzles each having an outlet area having a horizontal length which is three times the vertical height for each nozzle, wherein said jet nozzle or nozzles are oriented to eject said hot gas at high velocity in a direction substantially tangential to a centerline of said annular nose cowl, and whereby the turbulent high velocity hot gas flow issuing front the jet nozzle or nozzles entrain air within said annular nose cowl so that the total volume of air and hot gases swirling around the interior of said annular nose cowl in a rotational direction has a substantially uniform temperature intermediate between that of said air and said hot gas flow and by direct contact with the interior surface of the nose cowl substantially uniformly heats the single skin nose cowl to a temperature that is sufficiently high to preclude the formation of ice on the exterior surface of the single skin nose cowl by the grazing flow of ambient air when the aircraft is in flight while also precluding the creation of an area of unduly elevated temperature in said nose cowl at a location aft of said outlet nozzle.

32. An anti-icing system comprising:

a substantially annular single skin nose lip having an exterior surface and an interior surface and positioned at the leading portion of an aircraft jet engine;

a bulkhead substantially closing the aft end of said single skin nose lip to provide an annular D-shaped duct;

a region of the jet engine having therein a hot, high pressure gas;

at least one conduit adapted to carry hot gas from said region having a temperature of about 100 to 500 degrees F. and a velocity of about 3 to 30 ft./min, said at least one conduit having an outlet end coupled to said housing through said bulkhead;

an outlet nozzle having a configuration selected from the group consisting of (i) a single elliptically shaped jet nozzle having an outlet area having a horizontal length which is eight times the vertical height of the nozzle, (ii) three elliptically shaped jet nozzles each having an outlet area having a vertical height which is three times the horizontal length for each nozzle, (iii) four elliptically shaped jet nozzles each having an outlet area having a vertical height which is three times the horizontal length for each nozzle, and (iv) four elliptically shaped jet nozzles each having an outlet area having a horizontal length which is three times the vertical height for each nozzle, wherein said jet nozzle or nozzles are oriented to eject said hot gas at high velocity in a direction substantially tangential to the centerline of said annular nose lip and into the flow of hot gas issuing from said outlet nozzle to create turbulence in said hot gas flow, and the turbulent high velocity hot gas flow issuing from the outlet nozzle entrains air within said annular single skin nose lip so that the total volume of air and hot gas swirling around the interior of said annular nose lip in a rotational direction has a substantially uniform temperature of from 35 to 41 degrees F. when the outside air temperature is about −40 degrees F. and the mass flow rate of said hot gas and air is about three times the mass flow rate of the gases leaving said outlet nozzle whereby such rotating hot gas and air by direct contact with the interior surface of said single skin annular nose lip raises the temperature of said D-shaped duct to a substantially uniform temperature that is sufficiently high to preclude the formation of ice on the exterior surface of said nose lip while simultaneously precluding the creation of an area of elevated temperature in said nose lip at a location aft of the point of injection of hot gas through said outlet nozzle.

33. A method of providing an anti-icing system for a nose cowl-for an annular air inlet of an aircraft jet engine propulsion system which precludes the creation of a hot spot on such nose cowl in the vicinity of injection of high pressure hot gas into such nose cowl, which method coniprises the steps of:

providing a single skin nose cowl positioned at the leading edge of an air inlet of an aircraft jet engine that is substantially closed by an aft bulkhead to enclose a quantity of air;

providing a source of high pressure hot gas;

introducing said high pressure hot gas into the quantity of air enclosed inlet said nose cowl in a direction substantially tangential to a centerline of said nose cowl to entrain the mass of gas within the nose cowl to create a volume of hot gas and air swirling in a rotational direction around the interior of said nose cowl at a substantially uniform temperature that is sufficiently high to preclude the formation of ice on an exterior surface of said nose cowl during flight; and creating turbulence and transverse stirring within the flow of high pressure hot gas during its introduction into said quantity of air by introducing such hot gas through an outlet nozzle having a configuration selected from the group consisting of (i) a single elliptically shaped jet nozzle having all outlet area having a horizontal length which is eight times the vertical height of the nozzle, (ii) three elliptically shaped jet nozzles each having an outlet area having a vertical height which is three times the horizontal length for each nozzle, (iii) four elliptically shaped jet nozzles each having an outlet area having a vertical height which is three times the horizontal length for each nozzle, and (iv) four elliptically shaped jet nozzles each having an outlet area having a horizontal length which is three times the vertical height for each nozzle, wherein said jet nozzle or nozzles are oriented to eject said hot gas at high velocity in a direction substantially tangential to a centerline of said annular nose cowl to thereby enhance the commingling of said hot gas and said quantity of air to preclude the creation of an area of elevated temperature on said nose cowl at a position aft of the point of introduction of said hot gas.

34. An anti-icing apparatus comprising:

a substantially closed annular nose cowl comprising an exterior surface and an interior surface and capable of being positioned at the leading edge of an inlet of an aircraft jet engine propulsion system;

at least one conduit comprising an outlet end coupled to the nose cowl, wherein the at least one conduit is capable of being coupled to a source of high pressure hot gas; and an outlet nozzle provided on the outlet end of the conduit, the outlet nozzle having a configuration selected from the group consisting of (i) a single elliptically shaped jet nozzle having an outlet area having a horizontal length which is eight times the vertical height of the nozzle, (ii) three elliptically shaped jet nozzles each having an outlet area having a vertical height which is three times the horizontal length for each nozzle, (iii) four elliptically shaped jet nozzles each having an outlet area having a vertical height which is three times the horizontal length for each nozzle, and (iv) four elliptically shaped jet nozzles each having an outlet area having a horizontal length which is three times the vertical height for each nozzle, wherein said jet nozzle or nozzles are oriented to eject said hot gas at high velocity in a direction substantially tangential to a centerline of said annular nose cowl.

\* \* \* \* \*

UNITED STATES PATENT AND TRADEMARK OFFICE
CERTIFICATE OF CORRECTION

PATENT NO.    : 6,267,328 B1
DATED         : July 31, 1999
INVENTOR(S)   : Vest

It is certified that error appears in the above-identified patent and that said Letters Patent is hereby corrected as shown below:

Column 2,
Line 50, "noselip" should read -- nose lip --
Line 62, "pressure" should read -- high pressure --

Column 3,
Line 5, "noselip" (both occurrences) should read -- nose lip --
Line 7, "noselip" should read -- nose lip --
Line 10, "noselip" should read -- nose lip --; and "cross sectional" should read
-- cross-sectional --

Column 4,
Line 1, "noselip" should read -- nose lip --
Line 16, "noselip" should read -- nose lip --
Line 57, "nozzel" should read -- nozzle --

Column 7,
Line 3, "noselip" should read -- nose lip --

Column 8,
Line 22, "nozzles" should read -- nozzle --
Line 27, "FIG. 10" should read -- FIG. 11 --
Line 34, "material" should read -- materially --

Column 9,
Line 23, "sting" should read -- stirring --

Column 10,
Line 19, "rate," should read -- rate --
Line 42, "conduit each" should read -- conduit, each --
Line 44, "substantail" should read -- substantially --
Line 48, "the" should read -- wherein the --

Column 11,
Line 37, "flight, and" should read -- flight; and --
Line 61, "precluded" should read -- preclude --

Column 13,
Line 43, "the" should read -- wherein the --
Line 63, "cowl-for" should read -- cowl for --
Line 66, "coniprises" should read -- comprises --

UNITED STATES PATENT AND TRADEMARK OFFICE
CERTIFICATE OF CORRECTION

PATENT NO.    : 6,267,328 B1
DATED         : July 31, 1999
INVENTOR(S)   : Vest

It is certified that error appears in the above-identified patent and that said Letters Patent is hereby corrected as shown below:

Column 14,
Line 7, "inlet" should read -- within --

Signed and Sealed this

Eighteenth Day of June, 2002

Attest:

Attesting Officer

JAMES E. ROGAN
Director of the United States Patent and Trademark Office